June 13, 1939. S. P. JONAS 2,162,088
STEERING WHEEL
Filed Jan. 18, 1936
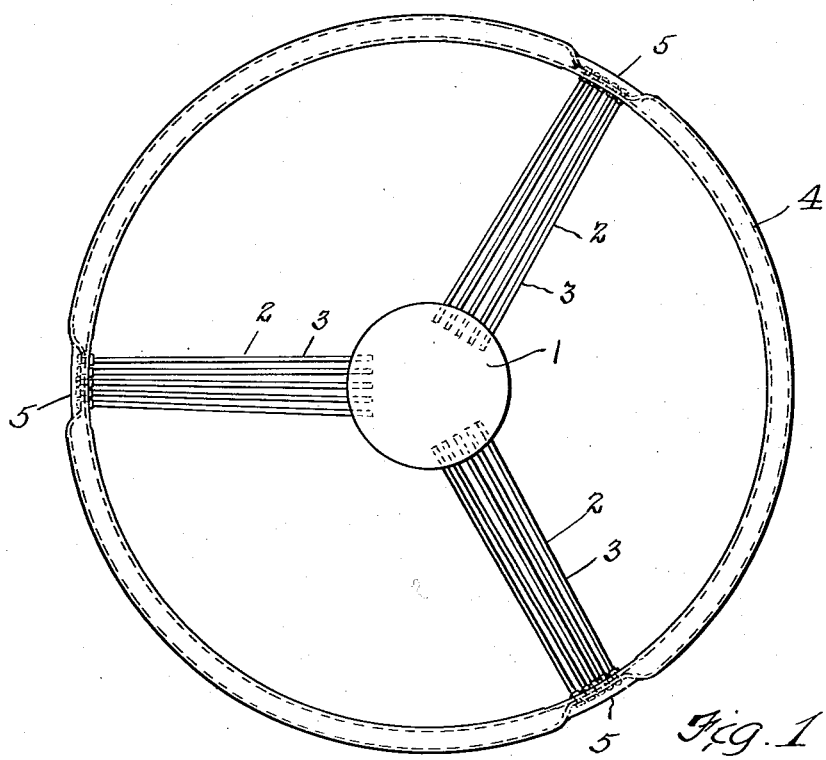
Fig. 1
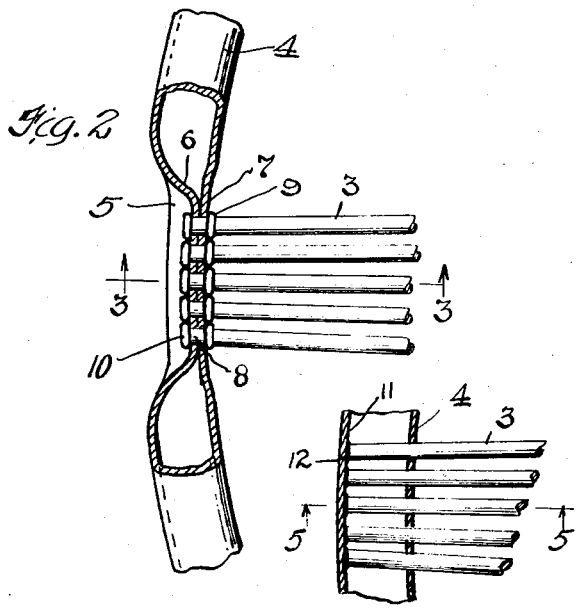
Fig. 2
Fig. 4
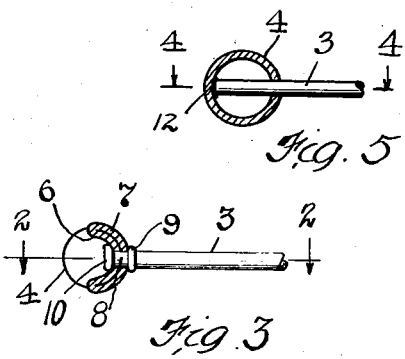
Fig. 5
Fig. 3
INVENTOR.
Stephen P. Jonas
BY
Fay, Oberlin & Fay
ATTORNEYS.

Patented June 13, 1939

2,162,088

UNITED STATES PATENT OFFICE 2,162,088

STEERING WHEEL

Stephen P. Jonas, Cleveland, Ohio, assignor to The Cleveland Welding Company, Cleveland, Ohio, a corporation of Ohio Application January 18, 1936, Serial No. 59,726

8 Claims. (Cl. 74—552)

This invention relates, as indicated, to steering wheels, and more particularly to a wheel of the character in which the spoke elements thereof comprise one or more radially extending rods, in the preferred form of my invention such spoke elements comprising a group of closely adjacent radially extending rods, and the rim element consisting of a tubular annulus, to which the spoke elements are secured at their radially outer ends.

More particularly, my invention comprises an improved form of connection between the radially outer ends of said spoke elements and the annulus forming the rim of the wheel and an improved method by which such wheel may be constructed.

It is the principal object of my invention to provide a wheel structure of the character described in which the spoke elements are joined to the rim member in such fashion that a rigid connection is provided without the formation of a bulky joint which is objectionable in wheels of this character, since the same are usually covered by a relatively thin layer of moldable composition and which joint between the spoke and rim members is further characterized by great strength and rigidity.

Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain structure and one mode of carrying out the invention, such disclosed structure and mode illustrating, however, but one of various ways in which the principle of the invention may be used.

In said annexed drawing:

Fig. 1 is a plan view showing one form of a wheel constructed in accordance with the principles of my invention;

Fig. 2 is a fragmentary part sectional, part elevational view drawn to an enlarged scale of a portion of the wheel shown in Fig. 1, illustrating more particularly the manner in which the spoke members are joined to the rim member;

Fig. 3 is a transvese sectional view of the structure illustrated in Fig. 2 taken on a plane substantially indicated by the line 3—3;

Fig. 4 is a fragmentary sectional view similar to Fig. 2 showing another form of connection between the spoke and rim members; and Fig. 5 is a transverse sectional view of structure illustrated in Fig. 4, taken on a plane substantially indicated by the line 5—5.

Referring more specifically to the drawing, and more especially to Fig. 1, a steering wheel constructed in accordance with the principles of my invention consists of a central hub member 1, radially extending groups 2 of spoke members 3 and an annular rim member 4, which is preferably tubular in form.

The hub member 1 will be provided with a central aperture, not shown, by which the same may be conveniently attached to a steering column. However, the construction of the central portion of the wheel is believed to be sufficiently well known to those familiar with the art and, not forming a part of this invention, the same will not be more particularly illustrated or described.

The rim member 4, as previously indicated, is in the form of a tubular annulus which may be conveniently provided by circularizing a tube of proper length, butt welding the ends of such circularized tube, and then grinding off the flash resulting from such welding operation to form a tubular annulus of uniform cross-section. Any mode may of course be employed for the purpose of providing the tubular annulus 4, which may be of any suitable material. However, since relatively great strength is provided, steel tubing is preferred.

In the areas where the groups 2 of the radially extending spoke members 3 are to be joined to the tubular annulus the latter is provided with deformed areas 5, the form of which is most clearly illustrated in Fig. 2. In the deformed areas 5 of the annulus 4 a radially outer segmental portion 6 of the wall of the latter is pressed radially inwardly until the same is substantially in contact with the diametrically opposite segmental portion 7 of the wall of the annulus. The section 7 of the annulus wall may be slightly flattened in the area where the spokes are to be attached in order to provide a flat area, against which the spokes may bear in the manner hereinafter more fully explained.

At suitably spaced intervals in the abutting portions 6 and 7 of the wall of the annulus there are provided openings extending radially therethrough which receive the ends 8 of the spoke members 3. The spoke members 3 are provided with integral collars 9 which abut against the radially inner face of the wall portion 7, and the outer ends 10 of the spokes are peened over or otherwise suitably upset in order to thus rigidly secure the radially outer ends of the spokes 3 to the annulus 4.

While the above defined method of securing the spoke members to the tubular annulus contemplates a deformation of the latter, nevertheless, as illustrated in Fig. 3, the wall portions of the annulus in the deformed areas are retained in substantial arcuate form, thus providing a construction in which the strength of the annulus in the deformed areas is not seriously impaired.

Another method by which the radially extending spoke members may, at their outer ends, be secured to the tubular annulus, as illustrated in Figs. 4 and 5, contemplates the provision of a suitably spaced group of apertures formed on the radially inner periphery of the annulus 4 of such size as to snugly admit the radially outer ends of the spoke members 3. The spokes 3 are projected through such openings and into abutting engagement with the inner face 11 of the outer wall 12 of the annulus. The outer ends 3 of the spokes may be secured to the wall 12 either by spot welding, in cases where the material of the spokes 3 and the annulus 4 admit of this type of welding, or when the spokes 3 are formed of material which does not readily lend itself to spot welding, such as stainless steel, a solder such as silver solder may be employed for the purpose of producing an atomic bond. When the expedient of soldering or brazing is resorted to for the purpose of thus connecting the spokes to the annulus, the solder may be carried into position by the ends of the spokes, or solder or abrazing material may be inserted into the tubular annulus 4 through the openings through which the spokes project before the spokes are inserted and when the area being operated upon is at the diametrically lowest point of the rim the solder will, by gravity, flow around and under the ends of the spokes when heated and thus provide the bond. Of course at the point at which the spokes project through the radially inner wall of the annulus 4, they may also be soldered or brazed to the latter in order to further reinforce the connection between the annulus and the spokes.

Other forms may be employed embodying the features of my invention instead of the one here explained, change being made as regards the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. In a wheel, the combination of a tubular annulus forming the rim member and a radially extending spoke member, said spoke member at its outer end extending through the radially inner portion of the wall of said annulus and secured to the diametrically opposite outer portion of said wall by likewise extending therethrough and being peened over at its outer end, said outer portion being depressed locally radially inwardly for engagement with said spoke.

2. In a wheel, the combination of a tubular annulus provided with a local circumferentially extending area in which a radially outer portion of the wall thereof is in engagement with the diametrically opposite wall, and a spoke member secured to said annulus in said area.

3. In a wheel, the combination of a tubular annulus provided with a local circumferentially extending area in which a radially outer portion of the wall thereof is in engagement with the diametrically opposite wall, and a spoke member secured to said annulus in said area by extending therethrough and being upset on opposite sides of said engaging walls.

4. In a wheel, the combination of a tubular annulus provided with a local circumferentially extending area in which radially outer and inner portions of the wall of said annulus are in engagement with each other, and a spoke member secured to said annulus in said area.

5. In a wheel, the combination of a tubular annulus provided with a local circumferentially extending area in which a radially outer portion of the wall is depressed radially inwardly and a spoke memger secured to said annulus by projecting radially through said area thereof and being terminally upset, the amount to which said outer wall is depressed radially inwardly being at least as great as the radially outward extent of said upset portion of the spoke whereby the spoke does not extend radially outward beyond the normal outside circumference of said annulus.

6. In a wheel, the combination of a tubular annulus, a local circumferential extending area of which has the radially outer wall thereof forced radially inwardly, and a spoke member secured to said annulus in said area.

7. In a wheel, the combination of a tubular annulus, a local circumferential extending area of which has the radially outer wall thereof forced radially inwardly, and a spoke member secured to said annulus by projecting through said area.

8. In a wheel, the combination of a tubular annulus, a local circumferential extending area of which has the radially outer wall thereof forced radially inwardly, and a spoke member secured to said annulus by projecting through said area and being peened over at its outer end.

STEPHEN P. JONAS.